US009007168B2

(12) United States Patent
Bos et al.

(10) Patent No.: US 9,007,168 B2
(45) Date of Patent: Apr. 14, 2015

(54) SYSTEM AND METHOD FOR ENROLLMENT OF A REMOTELY CONTROLLED DEVICE IN A TRAINABLE TRANSMITTER

(75) Inventors: Jeremy Bos, Coopersville, MI (US); Carl Shearer, Hudsonville, MI (US); David A. Blaker, Holland, MI (US); John D. Spencer, Allendale, MI (US); Todd R. Witkowski, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 1074 days.

(21) Appl. No.: 12/898,567

(22) Filed: Oct. 5, 2010

(65) Prior Publication Data

US 2011/0025456 A1 Feb. 3, 2011

Related U.S. Application Data

(63) Continuation of application No. 11/511,071, filed on Aug. 28, 2006, now Pat. No. 7,911,358, which is a continuation-in-part of application No. 10/530,588, filed as application No. PCT/US03/31977 on Oct. 8, 2003, now abandoned.

(60) Provisional application No. 60/416,829, filed on Oct. 8, 2002.

(51) Int. Cl.

| | |
|---|---|
| ***G05B 19/02*** | (2006.01) |
| ***G08C 17/02*** | (2006.01) |
| ***G08C 19/28*** | (2006.01) |

(52) U.S. Cl.

CPC ................ *G08C 17/02* (2013.01); *G08C 19/28* (2013.01); *G08C 2201/91* (2013.01); *G08C 2201/92* (2013.01)

(58) Field of Classification Search

CPC ........................................................ B60R 25/24
USPC .................................. 340/5.72, 5.61, 4.3, 5.7
See application file for complete search history.

(56) References Cited

U.S. PATENT DOCUMENTS

| | | | | |
|---|---|---|---|---|
| 4,543,957 | A | 10/1985 | Friedman et al. | |
| 4,988,992 | A * | 1/1991 | Heitschel et al. | 340/12.23 |

(Continued)

FOREIGN PATENT DOCUMENTS

| | | | |
|---|---|---|---|
| CA | 2295975 | A1 | 12/1999 |
| EP | 1 176 392 | A1 | 1/2002 |

(Continued)

OTHER PUBLICATIONS

US Office Action dated Mar. 13, 2012 as received in U.S. Appl. No. 12/438,939, 24 pages.

(Continued)

*Primary Examiner* — Jennifer Mehmood
*Assistant Examiner* — Rufus Point
(74) *Attorney, Agent, or Firm* — Foley & Lardner LLP; Scott P. Ryan

(57) ABSTRACT

A wireless control system is configured to be trainable to control any number of remotely controlled devices. The system can be configured to gather and learn information relating to a signal transmitted by the original transmitter in a manner that is blind to a user of the system. The system can be designed to learn signals automatically such that fewer steps are necessary for a user to train the system to control a particular remotely controlled device. The system can train to remotely controlled devices in this manner with little or no user action required.

20 Claims, 5 Drawing Sheets

(56) References Cited

U.S. PATENT DOCUMENTS

| | | | | |
|---|---|---|---|---|
| 5,414,426 | A | 5/1995 | O'Donnell et al. | |
| 5,550,930 | A | 8/1996 | Berman et al. | |
| 5,583,844 | A | 12/1996 | Wolf et al. | |
| 5,614,885 | A | 3/1997 | Van Lente et al. | |
| 5,646,701 | A | 7/1997 | Duckworth et al. | |
| 5,661,804 | A * | 8/1997 | Dykema et al. | 380/274 |
| 5,689,245 | A | 11/1997 | Noreen et al. | |
| 5,729,210 | A | 3/1998 | Kiriyama | |
| 5,781,143 | A | 7/1998 | Rossin | |
| 5,793,300 | A | 8/1998 | Suman et al. | |
| 5,854,593 | A | 12/1998 | Dykema et al. | |
| 5,893,920 | A | 4/1999 | Shaheen et al. | |
| 5,903,226 | A * | 5/1999 | Suman et al. | 340/12.28 |
| 6,091,343 | A | 7/2000 | Dykema et al. | |
| 6,133,703 | A * | 10/2000 | Fitzgibbon et al. | 318/445 |
| 6,166,650 | A * | 12/2000 | Bruwer | 340/5.26 |
| 6,271,765 | B1 | 8/2001 | King et al. | |
| 6,326,889 | B1 | 12/2001 | Van Horn et al. | |
| 6,377,173 | B1 * | 4/2002 | Desai | 340/426.36 |
| 6,392,534 | B1 | 5/2002 | Flick | |
| 6,476,732 | B1 * | 11/2002 | Stephan | 340/988 |
| 6,563,430 | B1 | 5/2003 | Kemink et al. | |
| 6,571,299 | B1 | 5/2003 | Schroyer et al. | |
| 6,580,838 | B2 | 6/2003 | Oliver et al. | |
| 6,856,237 | B1 * | 2/2005 | Richmond et al. | 340/5.23 |
| 6,877,097 | B2 | 4/2005 | Hamid et al. | |
| 6,985,450 | B2 * | 1/2006 | Slemmer et al. | 370/270 |
| 7,064,675 | B2 | 6/2006 | Zigmond et al. | |
| 7,116,242 | B2 * | 10/2006 | Guthrie | 340/4.3 |
| 7,161,466 | B2 * | 1/2007 | Chuey | 340/5.26 |
| 7,174,130 | B2 | 2/2007 | Kurisko et al. | |
| 7,197,394 | B2 * | 3/2007 | Ohler | 701/423 |
| 7,346,374 | B2 | 3/2008 | Witkowski et al. | |
| 7,375,612 | B2 | 5/2008 | Murray et al. | |
| 7,429,910 | B2 | 9/2008 | Domenz et al. | |
| 7,492,277 | B2 * | 2/2009 | Zigmond et al. | 340/12.52 |
| 7,492,278 | B2 | 2/2009 | Zigmond et al. | |
| 7,635,960 | B2 * | 12/2009 | Mullet et al. | 318/280 |
| 7,639,155 | B2 | 12/2009 | Gauthier et al. | |
| 7,768,420 | B2 * | 8/2010 | Neogi et al. | 340/12.53 |
| 7,904,069 | B2 | 3/2011 | Rye et al. | |
| 7,911,358 | B2 * | 3/2011 | Bos et al. | 340/4.3 |
| 8,004,389 | B1 * | 8/2011 | Mui | 340/13.24 |
| 8,049,595 | B2 * | 11/2011 | Olson et al. | 340/5.61 |
| 8,218,608 | B2 * | 7/2012 | Nantz et al. | 375/219 |
| 2001/0034213 | A1 * | 10/2001 | Tsui | 455/92 |
| 2001/0043145 | A1 * | 11/2001 | Jacobson, Jr. | 340/825.72 |
| 2002/0075133 | A1 | 6/2002 | Flick | |
| 2002/0186144 | A1 | 12/2002 | Meunier | |
| 2002/0190872 | A1 | 12/2002 | Suman et al. | |
| 2002/0197954 | A1 | 12/2002 | Schmitt et al. | |
| 2003/0005030 | A1 * | 1/2003 | Sutton et al. | 709/200 |
| 2003/0033540 | A1 * | 2/2003 | Fitzgibbon | 713/200 |
| 2003/0053378 | A1 | 3/2003 | Lovin et al. | |
| 2003/0126243 | A1 * | 7/2003 | Kudo et al. | 709/222 |
| 2003/0146871 | A1 * | 8/2003 | Karr et al. | 342/457 |
| 2003/0197594 | A1 * | 10/2003 | Olson et al. | 340/5.61 |
| 2003/0197595 | A1 * | 10/2003 | Olson et al. | 340/5.61 |
| 2004/0001095 | A1 | 1/2004 | Marques | |
| 2004/0048622 | A1 | 3/2004 | Witkowski et al. | |
| 2004/0061591 | A1 | 4/2004 | Teich | |
| 2004/0181622 | A1 * | 9/2004 | Kiser et al. | 710/72 |
| 2004/0210327 | A1 | 10/2004 | Robb | |
| 2005/0024185 | A1 | 2/2005 | Chuey | |
| 2005/0215233 | A1 | 9/2005 | Perera et al. | |
| 2005/0231134 | A1 * | 10/2005 | Sid | 315/294 |
| 2005/0242970 | A1 * | 11/2005 | Blaker et al. | 340/870.07 |
| 2005/0272372 | A1 * | 12/2005 | Rodriguez | 455/66.1 |
| 2005/0283311 | A1 * | 12/2005 | Ohler | 701/209 |
| 2005/0285737 | A1 * | 12/2005 | Kobayashi | 340/552 |
| 2006/0068750 | A1 | 3/2006 | Burr | |
| 2006/0116178 | A1 | 6/2006 | Vuong et al. | |
| 2006/0116667 | A1 | 6/2006 | Hamel et al. | |
| 2006/0153383 | A1 | 7/2006 | Bejean | |
| 2006/0155836 | A1 | 7/2006 | Chang et al. | |
| 2006/0181428 | A1 | 8/2006 | Blaker et al. | |
| 2006/0274166 | A1 | 12/2006 | Lee et al. | |
| 2006/0279399 | A1 | 12/2006 | Chuey | |
| 2007/0057810 | A1 * | 3/2007 | Bos et al. | 340/825.69 |
| 2007/0080845 | A1 | 4/2007 | Amand | |
| 2007/0149189 | A1 | 6/2007 | Yang et al. | |
| 2007/0159990 | A1 * | 7/2007 | Wu et al. | 370/310 |
| 2008/0003946 | A1 | 1/2008 | Lee et al. | |
| 2008/0021777 | A1 | 1/2008 | Mack et al. | |
| 2008/0022323 | A1 | 1/2008 | Koo | |
| 2008/0069404 | A1 | 3/2008 | Lee et al. | |
| 2008/0102793 | A1 | 5/2008 | Ananthanarayanan et al. | |
| 2008/0287062 | A1 | 11/2008 | Claus et al. | |
| 2008/0291047 | A1 | 11/2008 | Summerford et al. | |
| 2008/0318549 | A1 | 12/2008 | Skubic et al. | |
| 2010/0007516 | A1 * | 1/2010 | Bos et al. | 340/825.69 |
| 2011/0025456 | A1 * | 2/2011 | Bos et al. | 340/4.3 |

FOREIGN PATENT DOCUMENTS

| | | | |
|---|---|---|---|
| EP | 1 202 525 | B1 | 5/2002 |
| GB | 2 362 681 | A | 11/2001 |
| JP | 2001-238274 | A | 8/2001 |
| JP | 2002-186055 | A | 6/2002 |
| JP | 2002-517643 | | 6/2002 |
| JP | 08-4227105 | | 12/2008 |
| WO | WO 94/02920 | A1 | 2/1994 |
| WO | WO 99/63308 | A1 | 12/1999 |
| WO | WO 00/75905 | A1 | 12/2000 |
| WO | WO 01/28187 | A1 | 4/2001 |
| WO | WO 03/056531 | A1 | 7/2003 |
| WO | WO 2004/034352 | A1 | 4/2004 |
| WO | WO 2005/043484 | A1 | 5/2005 |
| WO | WO 2008/025007 | A2 | 2/2008 |
| WO | WO 2008/027830 | A2 | 3/2008 |

OTHER PUBLICATIONS

Notice of Allowance dated Nov. 12, 2010 as received in U.S. Appl. No. 11/511,071, 9 pages.

US Office Action received in connection with related U.S. Appl. No. 12/438,939 DTD Feb. 14, 2013.

Office Action for U.S. Appl. No. 12/438,723, dated Aug. 31, 2011, 7 pages.

US Notice of Allowance DTD Feb. 27, 2014.

International Search Report and Written Opinion for International Patent Application No. PCT/US2007/076814, mailed Mar. 27, 2008, 8 pages.

International Search Report and Written Opinion for International Patent Application No. PCT/US2007/076880, mailed Mar. 31, 2008, 10 pages.

International Search Report for Application No. PCT/US2003/031977, mailed Feb. 5, 2004, 3 pages.

Lind et al., The Network Vehicle—A Glimpse Into the Future of Mobile Multi-Media, Digital Avionics Systems Conference, Oct. 31-Nov. 7, 1998, pp. I21-1-I21-8.

Notification of Reason(s) for Refusal for Japanese Patent Application No. 2004-543578, Dispatch Date Oct. 30, 2007, 2 pages.

Office Action for European Application No. 07841366.3, dated May 12, 2010, 7 pages.

Office Action for European Application No. 07841394.5, dated May 4, 2010, 6 pages.

Office Action for U.S. Appl. No. 10/530,588, dated Dec. 9, 2008, 21 pages.

Office Action for U.S. Appl. No. 10/530,588, dated Sep. 20, 2007, 16 pages.

Office Action for U.S. Appl. No. 11/511,071 dated Jun. 10, 2010, 16 pages.

Office Action for U.S. Appl. No. 11/511,071 dated Oct. 15, 2009, 14 pages.

Final Office Action mailed Aug. 28, 2013, as received in co-pending U.S. Appl. No. 12/438,939.

EP Office Action for 07 841 366.3 dated Dec. 22, 2011, 5 pages.

Notice of Allowance for U.S. Appl. No. 12/438,723, dated Dec. 27, 2011, 7 pages.

* cited by examiner

| LOCATION | WIRELESS CONTROL SIGNAL |
|---|---|
| HOME | GARAGE DOOR OPENER SIGNAL |
| OFFICE | PARKING STRUCTURE GATE SIGNAL |

SYSTEM AND METHOD FOR ENROLLMENT OF A REMOTELY CONTROLLED DEVICE IN A TRAINABLE TRANSMITTER

CROSS-REFERENCE TO RELATED PATENT APPLICATIONS

This application is a Continuation of application Ser. No. 11/511,071, filed Aug. 28, 2006, which is a Continuation-In-Part of application Ser. No. 10/530,588, filed Apr. 7, 2005, which is a national stage application of PCT Application No. PCT/US2003/031977, filed Oct. 8, 2003, which claims priority from Provisional Application No. 60/416,829, filed Oct. 8, 2002. Each of application Ser. No. 11/511,071, application Ser. No. 10/530,588, PCT Application No. PCT/US2003/031977, and Provisional Application No. 60/416,829 are hereby incorporated herein by reference in their entireties.

BACKGROUND

In the field of wireless control of remote electronic systems, technological advances have been developed to improve convenience, security, and functionality for the user. One example is a trainable transceiver for use with various remote electronic systems, such as security gates, garage door openers, lights, and security systems. A user trains the trainable transceiver by, for example, transmitting a signal from a remote controller in the vicinity of the trainable transceiver. The trainable transceiver learns the carrier frequency and data code of the signal and stores this code for later retransmission. In this manner, the trainable transceiver can be conveniently mounted within a vehicle interior element (e.g., visor, instrument panel, overhead console, etc.) and can be configured to operate one or more remote electronic systems.

Further advances are needed in the field of wireless control of remote electronic systems, particularly in the case of using automotive electronics to control remote electronic systems. As automotive manufacturers are adding increased electronic systems to the vehicle to improve convenience, comfort, and productivity, simplifying the interface and control of these electronic systems is also becoming increasingly important. In addition, as automotive manufacturers are adding increased electronic systems to the vehicle, providing greater control over more systems is also becoming increasingly important.

Navigation systems, such as the global positioning system, vehicle compass, distance sensors, and other navigation systems, are being added to vehicles to provide navigation information to the vehicle occupants. On-board navigation systems also present opportunities to improve existing electronic systems to take advantage of vehicle location data which was not previously available.

What is needed is an improved wireless control system and method for wireless control of a remote electronic system from a vehicle, wherein the location of the vehicle is used to improve the convenience by customizing the functionality of the wireless control system. Further, what is needed is a system and method of customizing inputs for a wireless control system on a vehicle for wireless control of a remote electronic system based on the location of the vehicle. Further still, what is needed is a transmitter for wirelessly controlling a plurality of remote electronic systems through a single input.

The teachings below extend to those embodiments which fall within the scope of the appended claims, regardless of whether they accomplish one or more of the above-mentioned needs.

SUMMARY

One embodiment is directed to a wireless control system for controlling a remotely operated electronic device. The remotely operated electronic device is controllable by an original transmitter. The system includes a processing circuit configured to receive information based on a signal transmitted by the original transmitter. The processing circuit is configured to automatically learn a signal to control the remotely operated device based on the information. The system also comprises a transmitter circuit coupled to the processing circuit. The transmitter circuit is configured to transmit a wireless control signal having control data that is based on the signal automatically learned by the processing circuit.

Another embodiment is directed to a wireless control system for controlling a remotely operated device. The remotely operated electronic device is controllable by an original transmitter. The system is configured to gather and learn information relating to a signal transmitted by the original transmitter in a manner that is blind to a user of the system.

Another embodiment is directed to a wireless control system for controlling a remotely operated device. The remotely operated electronic device is controllable by an original transmitter. The system is configured to learn a signal transmitted by the original transmitter without being prompted to learn the signal by a user of the system.

Another embodiment is directed to a wireless control system for controlling a remotely operated device. The remotely operated electronic device is controllable by an original transmitter. The system includes a trainable transmitter having a learning mode initiated by a user in which signals usable to control remotely operated electronic devices are trained to the trainable transmitter. The trainable transmitter is also configured to learn information relating to the signal transmitted by the original transmitter when the trainable transmitter is not in the user initiated learning mode.

According to another embodiment, a wireless control system for customizing a wireless control signal for a remote electronic system based on the location of the wireless control system includes a transmitter circuit, an interface circuit, and a control circuit. The transmitter circuit is configured to transmit a wireless control signal having control data which will control the remote electronic system. The interface circuit is configured to receive navigation data from a navigation data source. The control circuit is configured to receive a transmit command, to receive navigation data, to determine a current location based on the navigation data, and to command the transmitter circuit to transmit a wireless control signal associated with the current location.

According to another embodiment, a method of training a wireless control system on a vehicle for wireless control of a remote electronic system based on the location of the vehicle includes receiving a request to begin training from a user. The method further includes receiving a current location for the vehicle. The method further includes providing control data for a signal to be sent wirelessly for a remote electronic system. The method further includes associating the current location for the vehicle with the control data for the remote electronic system.

According to yet another embodiment, a method of transmitting a wireless control signal for controlling a remote electronic system based on the location of a vehicle includes receiving a current location for a vehicle. The method further includes comparing the current location of the vehicle with a plurality of stored locations, each location associated with a wireless control signal. The method further includes determining the wireless control signal associated with the stored location closed to the current location and transmitting the wireless control signal associated with the stored location closest to the current location.

According to still another embodiment, a transmitter for wirelessly controlling a plurality of remote electronic systems at one of a plurality of locations includes a memory, a transmitter circuit, and a control circuit. The memory is configured to store a plurality of control data messages and a plurality of locations, each control data message configured to control a different remote electronic system. The memory is configured to associate each location with a plurality of control data messages. The control circuit is configured to command the transmitter circuit to transmit a plurality of wireless control signals associated with a location in response to a single event, each wireless control signal containing a different control data message.

The above listed embodiments can be used separately or in combination. Further, the invention is defined by the claims and is not limited to the embodiments described above.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
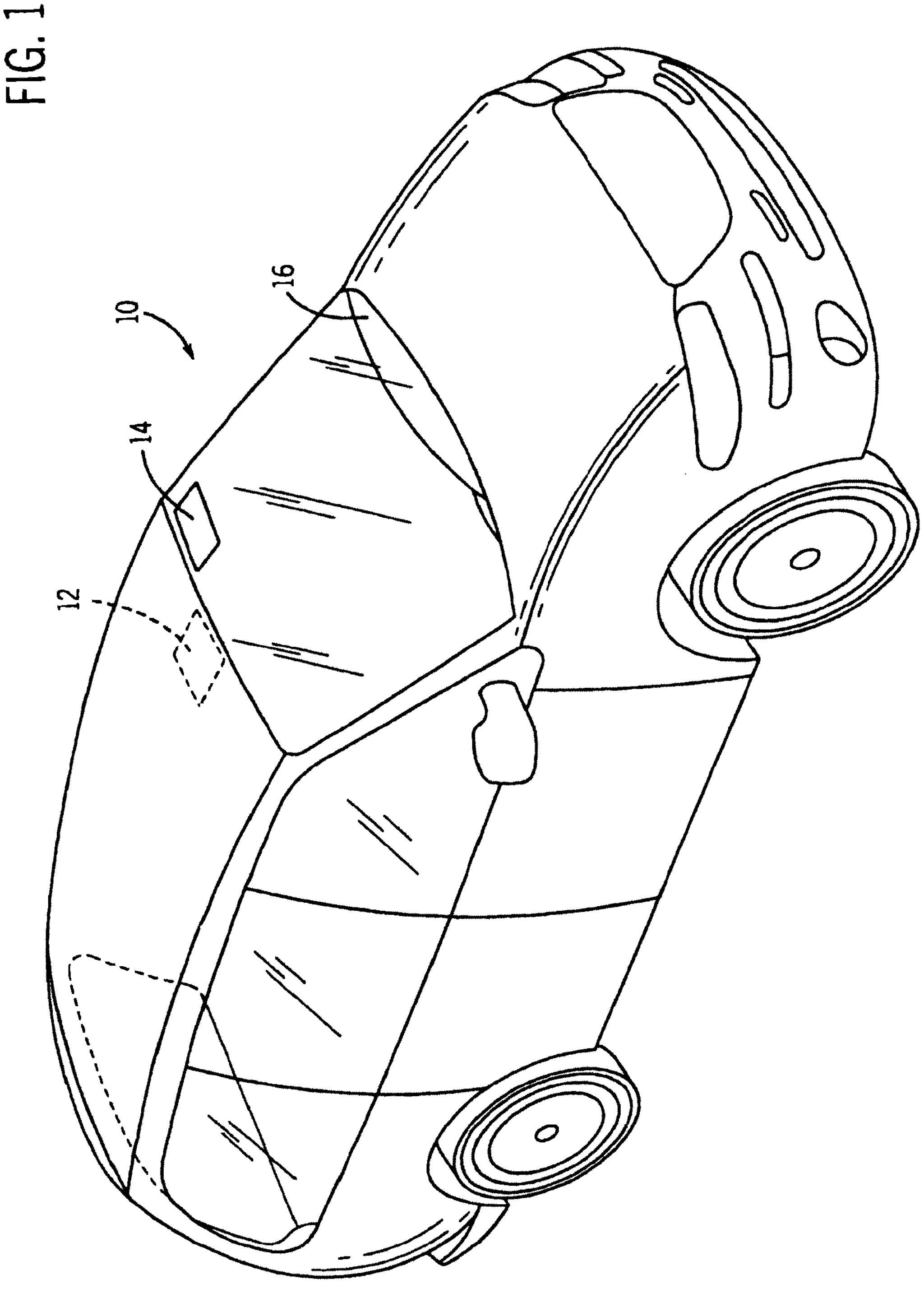
FIG. 1 is a perspective view of a vehicle having a wireless control system, according to an exemplary embodiment.

Referring first to FIG. 1, a vehicle 10, which may be an automobile, truck, sport utility vehicle (SUV), mini-van, or other vehicle, includes a wireless control system 12. Wireless control system 12, the exemplary embodiments of which will be described hereinbelow, is illustrated mounted to an overhead console of vehicle 10. Alternatively, one or more of the elements of wireless control system 12 may be mounted to other vehicle interior elements, such as, a visor 14, an overhead console, or instrument panel 16. Alternatively, wireless control system 12 could be mounted to a key chain, keyfob or other handheld device.

Figure 2:
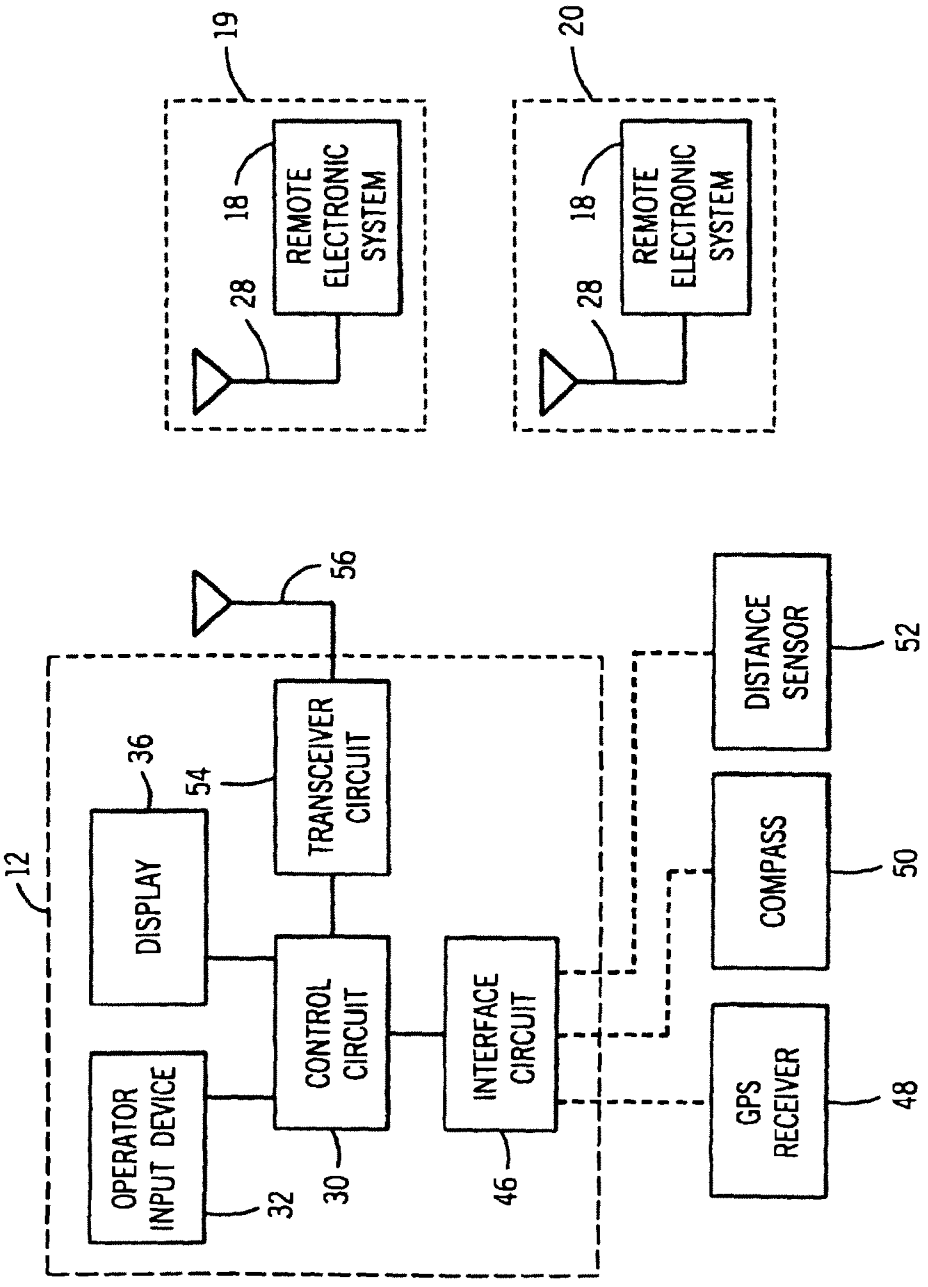
FIG. 2 is a block diagram of a wireless control system and a plurality of remote electronic systems, according to an exemplary embodiment.

Referring now to FIG. 2, wireless control system 12 is illustrated along with a first remote electronic system 18 at a first location 19 and a second remote electronic system 18 at a second location 20. Remote electronic system 18 may be any of a plurality of remote electronic systems, such as, a garage door opener, a security gate control system, security lights, home lighting fixtures or appliances, a home security system, etc. For example, the remote electronic systems may be garage door openers, such as the Whisper Drive garage door opener, manufactured by the Chamberlain Group, Inc., Elmhurst, Ill. The remote electronic systems may also be lighting control systems using the X10 communication standard. Remote electronic system 18 includes an antenna 28 for receiving wireless signals including control data which will control remote electronic system 18. The wireless signals are preferably in the ultra-high frequency (UHF) band of the radio frequency spectrum, but may alternatively be infrared signals or other wireless signals.

First location 19 and second location 20 may be any location including a remote electronic system 18. For example, first location 19 may be the residence of a user including a garage door opener and a security system, and second location 20 may be the office of a user including a parking structure gate configured to be operated by a wireless control signal.

Wireless control system 12 includes a control circuit 30 configured to control the various portions of system 12, to store data in memory, to operate preprogrammed functionality, etc. Control circuit 30 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 30 is coupled to an operator input device 32 which includes one or more push button switches 34 (see FIG. 3), but may alternatively include other user input devices, such as, switches, knobs, dials, etc., or more advanced input devices, such as biometric devices including fingerprint or eye scan devices or even a voice-actuated input control circuit configured to receive voice signals from a vehicle occupant and to provide such signals to control circuit 30 for control of system 12.

Control circuit 30 is further coupled to a display 36 which includes a light-emitting diode (LED), such as, display element 38. Display 36 may alternatively include other display elements, such as a liquid crystal display (LCD), a vacuum florescent display (VFD), or other display elements.

Wireless control system 12 further includes an interface circuit configured to receive navigation data from one or more navigation data sources, such as a GPS receiver 48, a vehicle compass 50, a distance sensor 52, and/or other sources of navigation data, such as gyroscopes, etc. Interface circuit 46 is an electrical connector in this exemplary embodiment having pins or other conductors for receiving power and ground, and one or more navigation data signals from a vehicle power source and one or more navigation data sources, respectively, and for providing these electrical signals to control circuit 30. GPS receiver 48 is configured to receive positioning signals from GPS satellites, to generate location signals (e.g., latitude/longitude/altitude) representative of the location of wireless control system 12, and to provide these location signals to control circuit 30 via interface circuit 46. Compass 50 includes compass sensors and processing circuitry configured to receive signals from the sensors representative of the Earth's magnetic field and to provide a vehicle heading to control circuit 30. Compass 50 may use any magnetic sensing technology, such as magneto-resistive, magneto-inductive, or flux gate sensors. The vehicle heading may be provided as an octant heading (N, NE, E, SE, etc.) or in degrees relative to North, or in some other format. Distance sensor 52 may include an encoder-type sensor to measure velocity and/or position or may be another distance sensor type. In this embodiment, distance sensor 52 is a magnetic sensor coupled to the transmission and configured to detect the velocity of the vehicle. A vehicle bus interface receives the detected signals and calculates the distance traveled based on a clock pulse on the vehicle bus. Other distance and/or velocity sensor types are contemplated, such as, using GPS positioning data.

Wireless control system 12 further includes a transceiver circuit 54 including transmit and/or receive circuitry configured to communicate via antenna 56 with a remote electronic system 18. Transceiver circuit 54 is configured to transmit wireless control signals having control data which will control a remote electronic system 18. Transceiver circuit 54 is configured, under control from control circuit 30, to generate a carrier frequency at any of a number of frequencies in the ultra-high frequency range, preferably between 260 and 470 megaHertz (MHz), wherein the control data modulated on to the carrier frequency signal may be frequency shift key (FSK) or amplitude shift key (ASK) modulated, or may use another modulation technique. The control data on the wireless control signal may be a fixed code or a rolling code or other cryptographically encoded control code suitable for use with remote electronic system 18.

Figure 3:
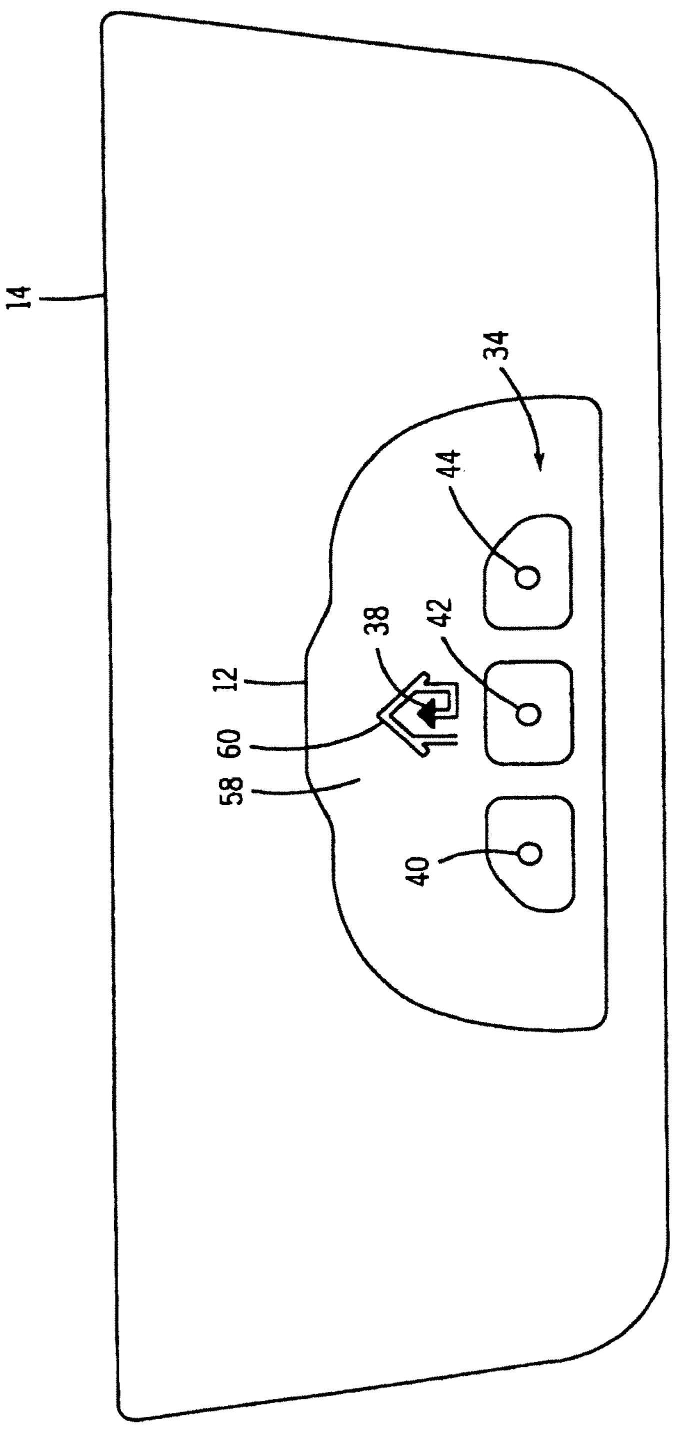
FIG. 3 is a schematic diagram of a visor having a wireless control system mounted thereto, according to an exemplary embodiment.

Referring now to FIG. 3, an exemplary wireless control system 10 is illustrated coupled to a vehicle interior element, namely a visor 14. Visor 14 is of conventional construction, employing a substantially flat, durable interior surrounded by a cushioned or leather exterior. Wireless control system 12 is mounted to visor 14 by fasteners, such as, snap fasteners, barbs, screws, bosses, etc. and includes a molded plastic body 58 having three push button switches disposed therein. Each of the switches includes a respective back-lit icon 40, 42, 44. Body 58 further includes a logo 60 inscribed in or printed on body 58 and having a display element 30 disposed therewith. During training and during operation, display element 38 is selectively lit by control circuit 30 (FIG. 2) to communicate certain information to the user, such as, whether a training process was successful, whether the control system 12 is transmitting a wireless control signal, etc. The embodiment shown in FIG. 3 is merely exemplary, and alternative embodiments may take a variety of shapes and sizes, and have a variety of different elements.

In operation, wireless control system 12 is configured for wireless control of remote electronic system 18 at first location 19 and/or remote electronic system 18 at second location 20 dependent on the location of wireless control system 12. Control circuit 30 is configured to receive navigation data from a navigation data source to determine a proximity between system 12 and first location 19 and between system 12 and second location 20, and to command transceiver circuit 54 to transmit a wireless control signal based on the proximity-between system 12 and first location 19 as compared to the proximity between system 12 and second location 20. For example, if system 12 is closer in proximity to first location 19, a wireless control signal associated with system 18 at first location 19 will be transmitted. In contrast, if system 12 is closer in proximity to second location 20, a wireless control signal associated with system 18 at second location 20 will be transmitted. According to an embodiment, the user of system 12 can train system 12 to learn locations 19 and 20. For example, when system 12 is located at first location 19, the user can actuate operator input device 32 to cause control circuit to receive and store the location from data provided by one or more of GPS receiver 48, compass 50, and/or distance sensor 52. According to an alternative embodiment, a user of system 12 can manually enter a longitude and latitude to define first location 19 or second location 20. System 12 will thereafter transmit the wireless control signal associated with remote electronic system 18 at first location 19 in response to a single event.

According to an alternative embodiment, the current location can be determined by using the vehicle compass and a speed signal to determine the current location. The system can monitor the path the vehicle is taking and compare it to stored paths (e.g. the vehicle was just traveling 40 mph for 2 miles, then turned right, traveled 0.5 miles at 20 mph, then turned left) Where the current path matches a stored path indicating a location proximate to remote electronic system 18, the wireless control signal for remote electronic system 18 will be transmitted.

According to an alternative embodiment, system 12 can be configured to transmit a wireless control signal associated with system 18 at first location 19 only when system 12 is within a known transmission range to the location. Where system 12 is not within range of any known remote electronic system 18, system 12 can be configured to provide some other function in response to the single event such as displaying a message indicating that system 12 is out of range.

Figures 4, 5:
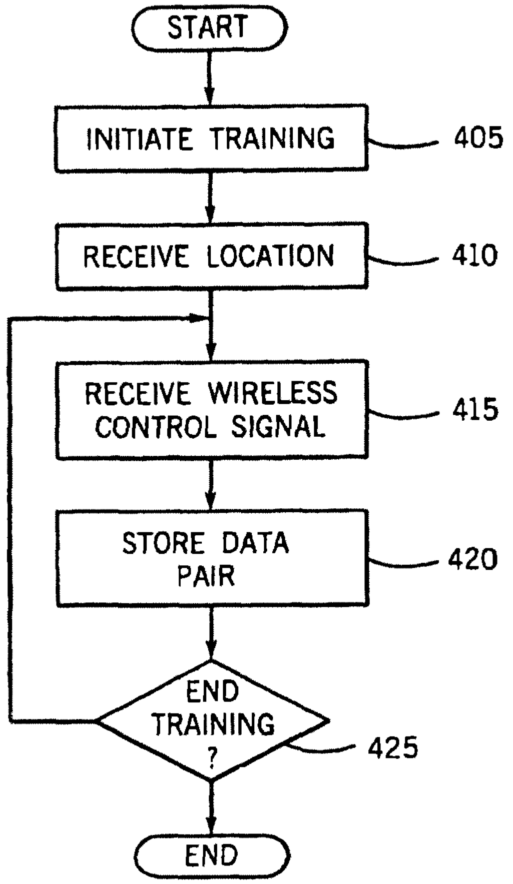
FIG. 4 is a flowchart of a method of training the wireless control system of FIG. 2, according to an exemplary embodiment.
FIG. 5 is a chart of a set of data pairs stored in memory, each data pair including a location and a corresponding control signal, according to an exemplary embodiment.

Referring now to FIG. 4, several training steps can be performed by the user. System 12 is trained to learn the location of both remote electronic system 18 at first location 19 and remote electronic system 18 at second location 20.

In this exemplary embodiment, system 12 learns according to a method for training a remote electronic system 18 at first location 19, in which data from GPS receiver 48 is available. In a first step 405, the user actuates one of switches 34 to change the mode of wireless control system 12 to a training mode. For example, the user may hold down one, two, or more of switches 34 for a predetermined time period (e.g., 10 seconds, 20 seconds, etc.) to place control circuit 30 in a training mode, or the user may actuate a separate input device (not shown in FIG. 3) coupled to control circuit 30 (FIG. 2) to place system 12 in the training mode.

In a step 410, with system 12, and more particularly the antenna of GPS receiver 48, positioned at first location 19, the user actuates one of the switches 34 to command control circuit 30 to take a location reading from GPS receiver 48 and to store this location information in memory, preferably in non-volatile memory, in order to train system 12 to learn the location of first remote electronic system 18.

In a step 415, the user indicates the wireless control signal to be associated with the current location. This step can be performed by selecting a previously stored wireless control signal or by inputting a new wireless control signal. A new wireless control signal can be input by actuating an original transmitter (OT) for remote electronic system 18 in proximity to system 12 for capture by system 12 as is well known in the art. While actuating the OT, the user actuates one of the switches 34 to command control circuit 30 to capture the wireless control signal.

The information received in steps 410 and 415 can be stored as an associated data pair in a step 420. FIG. 5 illustrates a set of stored locations and associated wireless control signals, stored as a plurality of data pairs. Each data pair includes a location and a wireless control signal. For example, in the exemplary data pairs shown, a home location (represented by a longitude and latitude) and a wireless control signal for a garage door opener are stored as a first pair, while an office location (also represented by a longitude and latitude) and a wireless control signal for a parking structure opener are stored as a second pair. Alternatively, in a system wherein a plurality of wireless control signals can be associated with a single location, described further with reference to FIG. 5, a table can include a single location associated with a plurality of wireless control signals.

Following storage of the data pair, a determination can be made in a step 425 whether additional training is desired. If additional training is desired, the system can return to step 415 to receive an additional wireless control signal for association with the location received in step 410. If no additional training is desired, training mode can be exited.

According to an alternative embodiment, the training process may be automated such that system 12 is configured to capture a wireless control signal whenever an OT sending a wireless control signal is actuated within close proximity to system 12. Upon determining that a new wireless control signal has been detected, system 12 determines the current location and stores the current location along with the detected wireless control signal in a new data pair. For example, a person approaching a parking garage for the first time may actuate a parking garage transmitter to open a gate to the parking garage. Upon detecting the parking garage wireless control signal from the parking garage transmitter and recognizing it as a new wireless control signal, system 12 stores the parking garage wireless control signal along with the current location in proximity to the parking garage in a new data pair. Subsequently, system 12 may be configured to transmit the parking garage wireless control signal when actuated in proximity to the parking garage. System 12 may also include additional features to facilitate automated training such as a prompt to the user whether a detected wireless control signal should be stored, security features to prevent accidental storage, etc.

Figure 6:
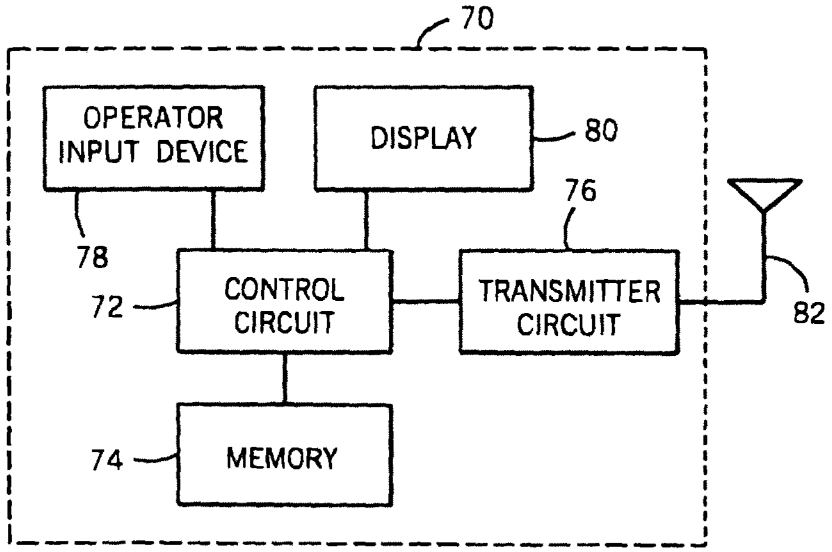
FIG. 6 is a block diagram of a transmitter for wirelessly controlling a plurality of remote electronic systems at a plurality of locations, according to an exemplary embodiment.

Referring now to FIG. 6, a transmitter or transceiver 70 for wirelessly controlling a plurality of remote electronic systems at a single location is illustrated, wherein the transmitter is configured to transmit a plurality of wireless control signals in response to a single event. Transmitter 70 includes a control circuit 72 similar to control circuit 30. Transmitter 70 further includes a memory 74, which may be a volatile or non-volatile memory, and may include read only memory (ROM), random access memory (RAM), flash memory, or other memory types. Transmitter 70 further includes a transmitter circuit 76 which may alternatively include receive circuitry, wherein transmitter circuit 76 is configured to transmit wireless control signals to one or more of first remote electronic systems 18 (FIG. 2). Transmitter 70 may be a hand-held transmitter, or may be mounted to a vehicle interior element. Transmitter 70 includes a memory 74 configured to store a plurality of control data, each control data configured to control a different remote electronic system. Transmitter 70 may further include an operator input device 78 and a display 80, which may have a similar configuration to operator input device 32 and display 36 in the embodiment of FIG. 2. The following feature of transmitting multiple wireless signals may be provided in the simplified transmitter of FIG. 6 or may alternatively be provided in system 12 in any of its various embodiments.

In operation, control circuit 72 is configured to command transmitter circuit 76 to transmit a plurality of wireless control signals over antenna 82 in response to a single event. Each wireless control signal contains a different control data message, each control data message being retrieved from memory 74. The wireless control signals may be radio frequency, infrared, or other wireless signals. The single event may be the operator actuation of operator input device 78 by a vehicle occupant. Alternatively, or in addition, control circuit 72 may be configured to receive navigation data and to determine a distance between the transmitter and first remote electronic system 18, in which case the single event can be the control circuit 72 determining that the transmitter 70 is within a predetermined distance of first remote electronic system 18.

Control circuit 72 is user-programmable such that the switch in operator input device 78 causes transmitter circuit 76 to send a first wireless control signal (e.g., to turn on security lights, open a security gate, etc.) and the control circuit 72 automatically sends a second wireless control signal different than the first wireless control signal (e.g., to lift a garage door) when control circuit 72 determines that transmitter 70 is within a predetermined distance of first remote electronic system 18. Further still, one switch within operator input device 78 may cause transmitter circuit 76 to send a first wireless control signal and a second switch within operator input 78 may cause transmitter 76 to send multiple control signals, wherein the multiple wireless control signals are transmitted simultaneously or in sequence.

In an exemplary embodiment wherein system 12 or transmitter 70 sends a plurality of different wireless control signals in response to actuation of one switch, one of the wireless control signals can be transmitted for a first predetermined time period (e.g., 1 to 2 seconds), then the second wireless control signals can be transmitted for a predetermined time period, (e.g., 1 to 2 seconds), and the cycle of transmissions can be repeated until the switch is released.

Figure 7:
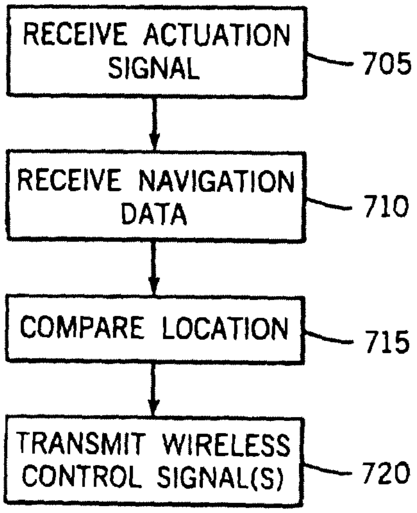
FIG. 7 is a flowchart of a method of wireless control of a remote electronic system based on location, according to an exemplary embodiment.

Referring now to FIG. 7, an exemplary method of transmitting a wireless control signal from a wireless control system on a vehicle for wireless control of a remote electronic system based on the location of the wireless control system will now be described. At a step 705, an actuation signal is received. The actuation signal can be received as the result of a user input, an automatic actuation based on a distance between a current location and remote electronic system 18, an automatic actuation based on timing information, or any other event.

In response to receipt of the actuation signal, navigation data indicative of the current location of system 12 is received in a step 710. The navigation data can be received by uploading from a continually updated location in memory containing the current location, through an interface circuit to an external navigation device, as the result of a user selection of the current location, or any other method.

In step 715, the navigation information received in step 710 is compared to a listing of known locations stored in memory as described with reference to FIGS. 4 and 5. In step 715, according to an exemplary embodiment, the current location of system 12 is compared to, the known locations to determine the known location that is most proximate to system 12. The determination can be made by comparing the longitude and latitude of the current location to the longitude and latitude of the known location.

After the most proximate known location is determined in step 715, the wireless control signal or plurality of wireless control signals associated with the most proximate known location can be retrieved and transmitted in a step 720. According to an alternative embodiment, a determination can be made prior to step 720 whether the known location is within transmission range of remote electronic system 18. The determination can be made by comparing a stored transmission range with the distance determined in step 715 of the distance between system 12 and the known location. If system 12 is within range of the known location, the wireless control signal is transmitted; if not, an out-of-range indicator can be provided to the user.

Automatic-Enrollment of an Original Transmitter in a Trainable Transmitter

Referring again to FIG. 2, the training process may be automated such that system 12 (i.e. the trainable transmitter of the system) is configured to capture a wireless control signal whenever an original transmitter (OT) sending a wireless control signal is actuated within close proximity to system 12.

In many embodiments of trainable transceivers, the transceiver will have a training/learning mode in which the transceiver will train to a remotely controlled device 19 and an operating mode in which the transceiver will operate to control the remotely controlled devices 19, 20. In many of these embodiments, the training mode is initiated based on a user command to enter the training mode (e.g. pushing a button, voice command, etc.). Generally, the operating mode is active whenever the training mode is not active. Automatic enrollment of an original transmitter may occur during an operating mode and/or without a user initiating a training or learning mode. In this way, a number of steps for training the trainable transmitter to a remotely controlled device 19 may be initiated blind to the user (i.e. without a user knowing that the steps are taking place and/or without user intervention).

Information gained blind to the user may be used to enroll an original transmitter. Using information to enroll an original transmitter could be completely enrolling an OT, substantially enrolling an OT, or partially enrolling an OT. For example, the information gained could be used to program system 12 to control the device 19, 20 controlled by the OT (e.g. could program the trainable transmitter with a frequency, code, and other information usable to control the remotely controlled device 19, 20).

In another example, using the information gained blind to the user to enroll an OT could include using the information received to reduce the time necessary to enroll a transmitter by training system 12 with some (although not all) of the information necessary to operate the remotely controlled device 19, 20 (e.g. with one or more of the frequency of operation, the code used, the type of signal, whether rolling, whether fixed, or other information).

In still another example, using the information gained blind to the user to enroll an OT could include using the information gained blind to the user to serve as a starting point for enrolling an OT in system 12. For example, system 12 could gain information relating to transmitted frequencies blind to the user. Then, in a user prompted training mode, system 12 could save time by starting with the frequency information that was gained blind to the user.

In still another example, system 12 might blindly obtain information from an original transmitter, determine that an enrollable transmitter is present, but not store any information from the enrollable transmitter. In this example, in response to the detection of an enrollable transmitter (blind to the user), system 12 might prompt a user to train the enrollable transmitter to system 12. This prompt can take any of the forms discussed below, such as voice information on the availability of and/or instructions on how to train the enrollable original transmitter to system 12, flashing light, etc.

System 12 may include additional features to facilitate automated training. For example, system 12 may include user control to allow the user to choose whether a newly learned signal should be stored (trained to) by system 12. Since the learned signal may be learned blind to the user, system 12 may include a prompt to the user indicating that a detected wireless control signal has been learned and/or can be stored.

The prompt to the user may take any number of forms. For example, the prompt may be an audible prompt (such as a voice prompt) that indicates that a new wireless control signal has been learned. In some embodiments, the prompt may take the form of a flashing or solid (continuously on) light 38 and/or display 36. In some embodiments, the prompt may be information displayed on a display screen 36, such as text and/or icons displayed on a screen or other multiple-line display, or may be displayed on a more simple display.

In some embodiments, a voice prompt may be configured to provide information relating to the system 12 (e.g. explain uses of the system, benefits of the system 12, etc.). This voice prompt may be different (e.g. may be different information, disabled, etc.) based on prior use/training of system 12, based on location, and/or based on some other input.

In some situations (e.g. while driving at high speeds), it may be inconvenient for a user to be interacting with the trainable transceiver. Thus, system 12 may be configured to limit the situations in which a prompt is given to a user. For example, system 12 may be configured to show the prompt after a signal has been learned only when the vehicle is in park and/or when vehicle speed is below a threshold (e.g. when the vehicle is not moving). In these embodiments, system 12 may be configured to learn and temporarily store a signal, wait until the user enters park, and only then prompt a user to confirm training of the signal to the trainable transmitter.

In some embodiments, additional security features may be included to prevent accidental storage of transmitted signals that do not correspond to devices controlled by a user of system 12 (e.g. a neighbor's garage door, etc.). One potential feature is to obtain data relating to the signal's proximity to a receiver (transceiver 54, antenna 56, etc.) of the system 12. For example, a signal may be judged to be close to the receiver based on its signal strength. In some embodiments, an OT is presumed to be transmitting at the maximum power allowed by a regulatory body (e.g. the FCC). An OT's proximity to the receiver may be judged based on the received signal strength compared to the maximum signal strength allowed. In some embodiments, the system 12 will only automatically enroll transmitters when a signal received from the transmitter meets a minimum threshold for power and/or signal strength. In some embodiments, the threshold may be adjustable prior to installation of the system 12 in a vehicle. In some embodiments, the threshold may be adjustable after installation of the system 12 in a vehicle.

Another potential security feature that may be included is the use of a speed threshold. For example, it may be assumed that someone using an OT to control a remote device would not be approaching the device at greater than a predetermined speed. In this example, system 12 may be configured such that it does not train to OTs when the vehicle is moving greater than a maximum speed. For example, a maximum speed criteria might be that the system 12 will only train when the vehicle is traveling at or below 30 mph, or may be that the vehicle is traveling at or below 20 mph.

Another potential security feature that may be included is that the vehicle is in an on state (e.g. may be that the vehicle accessory level is on, or may be that the vehicle engine is running, etc.).

Another potential security feature that may be used is that a signal from an OT must be identified a threshold number of times by system 12 before system 12 will automatically use or enroll the information from that signal. In some embodiments, this may require identifying the same training information one time or at least two times. In other embodiments, this may require identifying the same training information a minimum number of times, the minimum number of times being at least 3 times and/or at least 5 times.

In some embodiments, system 12 may be configured to only automatically enroll a transmitter if none of the channels (buttons) of the system 12 have previously been trained. In other embodiments, system 12 may be configured to automatically enroll any number of transmitters. In these embodiments, system 12 may be configured to review the information previously trained in order to avoid duplicating enrollment of a single transmitter. For rolling code based original transmitters, training a trainable transmitter may include storing a non-rolling portion of the message (e.g. serial number) sent by the OT. This additional step may be taken during both automatic and manual enrollment of the rolling code based transmitter.

In some embodiments, it may be advantageous to be able to learn a signal from a transmitter that is not directly next to the receiver of system 12. In these embodiments, system 12 may be capable of training to a signal received from a transmitter in at least about 20% of the cabin of the vehicle in which the system 12 is installed. In some of these embodiments, it may be trainable in at about 40% or at least about 60% of the cabin.

In some embodiments, system 12 may still have a more limited range in which to train. In some of these embodiments, system 12 may only be trainable in up to about 80% or about 60% of the cabin of the vehicle in which system 12 is located. In some of these embodiments, system 12 may only be trainable in up to about 40% or up to about 20% of the cabin.

In some embodiments, receiver 54 and/or control circuit 30 may comprise low power scanning modes which may run continuously, which may run during limited periods (e.g. when a car is running), or which may run at defined times to scan for signals to be learned.

Any of the thresholds discussed above could be inputs to a multiple criteria formula such that the thresholds are variable (depending on the values of other criteria) rather than fixed.

Vehicle speed information may be obtained from any number of sensors. The sensors may include a standard vehicle speed sensor such as a wheel rotation sensor, may include a GPS circuit, may include a vehicle transmission circuit (e.g. a sensor indicating that a vehicle is in park), and/or any number of other sensors. The sensors may be directly connected to system 12 (e.g. to a trainable transmitter such as the trainable transceiver) or may be indirectly connected (e.g. over a vehicle bus).

When used with a location determining device, upon determining that a new wireless control signal has been detected, system 12 may determine the current location and store the current location along with the detected wireless control signal in a new data pair. For example, a person approaching a parking garage for the first time may actuate a parking garage transmitter to open a gate to the parking garage. Upon detecting the parking garage wireless control signal from the parking garage transmitter and recognizing it as a new wireless control signal, system 12 may store the parking garage wireless control signal along with the current location in proximity to the parking garage in a new data pair. Subsequently, system 12 may be configured to transmit the parking garage wireless control signal when actuated in proximity to the parking garage.

In most embodiments, the trainable transmitter will be a trainable transceiver. In other embodiments, the trainable transmitter may only transmit signals and will be trainable without receiving signals. In some embodiments, system 12 will use the receiver to receive multiple types of data. For example, the receiver may also be used as a remote keyless entry receiver, may be used as a tire pressure monitor receiver, and/or may receive other types of information in addition to remote control (e.g. garage door opener) signals.

In most instances, the OT will be a dedicated transmitter for the device 19, 20 being controlled. In some instances, the OT might be a previously programmed trainable transmitter. In some rare instances, the OT might be the remotely controlled device 19, 20 itself (e.g. the remotely controlled device 19, 20 might be programmed to send out a signal that mimics the signal used to control the device 19, 20).

What is claimed is:

1. A system for controlling a remotely operated device, the remotely operated device controllable by an original transmitter, the system comprising:

a processing circuit located remotely from the original transmitter and remotely from the remotely operated device, the processing circuit configured to learn a signal transmitted by the original transmitter and received at the processing circuit from the original transmitter without the processing circuit being prompted to learn the signal by a user of the system; and a transmitter circuit coupled to the processing circuit, the transmitter circuit configured to transmit a wireless control signal having control data based on the signal learned by the processing circuit, wherein the wireless control signal is not based on information received from a wireless transmitter other than the original transmitter.

2. The system of claim 1, wherein a user is prompted to finalize training of signal based on the information that was learned without prompting by the user, the prompt not occurring while a vehicle is moving.

3. A system for controlling a remotely operated device, the remotely operated device controllable by an original transmitter, the system comprising:

a trainable transmitter, located remotely from the original transmitter and remotely from the remotely operated device, the trainable transceiver having a learning mode initiated by a user in which signals usable to control remotely operated electronic devices are trained to the trainable transmitter, and an operating mode in which signals trained to the trainable transmitter are sent;

wherein the trainable transmitter is configured to receive and learn information from the original transmitter when the trainable transmitter is not in the user initiated learning mode, and wherein the trainable transmitter does not learn information from a wireless transmitter other than the original transmitter.

4. The system of claim 3, wherein the system is installed in a vehicle; and wherein the trainable transmitter is configured to learn the information only while the vehicle is in an on state.

5. A system for controlling a remotely operated device, the remotely operated device controllable by an original transmitter, the system comprising:

a receiver located remotely from the original transmitter and remotely from the remotely operated device, the receiver configured to receive a signal transmitted by the original transmitter;

a processing circuit configured to receive a signal from the receiver, the processing circuit configured to automatically learn a wireless control signal to control the remotely operated device by storing a characteristic of the signal from the receiver; and a transmitter circuit coupled to the processing circuit, the transmitter circuit configured to transmit the wireless control signal having the stored characteristic of the signal from the receiver, and wherein the wireless control signal is not based on information received from a wireless transmitter other than the original transmitter.

6. The system of claim 5, wherein a user is prompted to finalize training of the signal that was automatically learned by the processing circuit.

7. The system of claim 6, wherein the prompt is a voice prompt.

8. The system of claim 6, wherein the prompt does not occur when a vehicle is moving.

9. The system of claim 5, further comprising a security feature configured to reduce a chance of learning a wireless control signal not associated with a user of the system.

10. The system of claim 5, wherein the processing circuit is configured to automatically learn the wireless control signal only if a power of the signal received from an original transmitter meets pre-determined criteria.

11. The system of claim 5, wherein the processing circuit is further configured to avoid training, based on the automatically learned wireless control signal, to signals to which the system is currently trained.

12. The system of claim 5, wherein the processing circuit is only configured to automatically learn information while a vehicle in which the system is installed is in an on state.

13. The system of claim 5, wherein the processing circuit is only configured to automatically learn the wireless control signal when the system is not trained to control any remotely controlled devices.

14. The system of claim 5, wherein the original transmitter is a remote keyless entry transmitter.

15. The system of claim 5, wherein the system is installed in a vehicle having a passenger cabin; and wherein the processing circuit is further configured to automatically learn wireless control signals from original transmitters located within the passenger cabin.

16. A method for operating a wireless control system in a vehicle for controlling a remotely operated device, the remotely operated electronic device controllable by an original transmitter, the method comprising:

obtaining, using a receiver of the wireless control system, a data control message from a signal transmitted by the original transmitter, wherein the receiver is located remotely from the original transmitter and remotely from the remotely operated device;

automatically storing the data control message in the wireless control system, the obtaining and storing completed by the wireless control system in a manner that is blind to a user of the system and without the wireless control system being first prompted by the user; and transmitting, from a transmitter of the wireless control system, a wireless control signal based on the stored data control message and wherein the wireless control signal is not based on a data control message received from a wireless transmitter other than the original transmitter.

17. The method of claim 16, further comprising: prompting a user to finalize training by retaining the stored data control message.

18. The method of claim 17, further comprising:

preventing the prompt from occurring while the vehicle in which the wireless control system is located is moving;

using security features configured to reduce a chance of learning a wireless control signal not associated with a user of the wireless control system; and only completing the obtaining and automatic storing steps while the vehicle in which the wireless control system is installed is in an on state.

19. A system for controlling a remotely operated device, the remotely operated device controllable by an original transmitter, the system comprising:

a transmitter circuit;

a receiver circuit;

a control circuit, located remotely from the original transmitter and located remotely from the remotely operated device, the control circuit configured to determine a first location based on received navigation data and to automatically associate the first location with first wireless control signal data received from the original transmitter at the receiver circuit;

wherein the control circuit is configured to store the first location and the received first wireless control signal data as a data pair of a plurality of data pairs, each data pair representing an association between a location and wireless control signal data;

wherein the control circuit is configured to compare newly received navigation data to the locations of the data pairs; and, in response to a match between the newly received navigation data and a second location of the data pairs, causes the transmitter to transmit a second wireless control signal according to second wireless control signal data associated with the second location;

wherein the control circuit is configured to automatically associate the first location with the first wireless control signal data received from the original transmitter without the control circuit having entered a training mode initiated by user input, and wherein the first wireless control signal data is not received from a wireless transmitter other than the original transmitter.

20. The system of claim 19, wherein the control circuit is configured to confirm the automatic association with a user via a prompt and subsequent user input.

* * * * *